United States Patent
Belter et al.

(10) Patent No.: US 12,502,031 B2
(45) Date of Patent: Dec. 23, 2025

(54) OUTDOOR GRILL TOY

(71) Applicant: Melissa & Doug, LLC, Wilton, CT (US)

(72) Inventors: Rachel Belter, Montclair, VA (US);
Brett Almstead, Ridgefield, CT (US);
Matt Burtonwood, West Yorkshire (GB)

(73) Assignee: Melissa & Doug, LLC, Wilton, CT (US)

( * ) Notice: Subject to any disclaimer, the term of this patent is extended or adjusted under 35 U.S.C. 154(b) by 576 days.

(21) Appl. No.: 17/901,422

(22) Filed: Sep. 1, 2022

(65) Prior Publication Data

US 2024/0074614 A1    Mar. 7, 2024

(51) Int. Cl.
*A63H 33/30*    (2006.01)
*A47J 37/07*    (2006.01)

(52) U.S. Cl.
CPC ....... *A47J 37/0786* (2013.01); *A47J 37/0713* (2013.01); *A63H 33/30* (2013.01); *A63H 33/3055* (2013.01)

(58) Field of Classification Search
CPC . A63H 33/30; A63H 33/3055; A63H 33/3094
See application file for complete search history.

(56) References Cited

U.S. PATENT DOCUMENTS

| | | | |
|---|---|---|---|
| 1,619,723 | A | 3/1927 | Hartman |
| 4,194,318 | A | 3/1980 | Watanabe |
| 4,214,401 | A | 7/1980 | Teter |
| D260,274 | S | 8/1981 | Appel et al. |

(Continued)

FOREIGN PATENT DOCUMENTS

| | | |
|---|---|---|
| CH | 345284 | 3/1960 |
| CN | 207980435 | 10/2018 |

(Continued)

OTHER PUBLICATIONS

Great Britain Search Report in GB2313327.5, dated Jan. 16, 2024.

(Continued)

*Primary Examiner* — John A Ricci
(74) *Attorney, Agent, or Firm* — Aird & McBurney LP

(57) ABSTRACT

A simulated outdoor gas-fired grill includes a simulated thermometer. A grill assembly includes a grate and a flame plate positioned below the grate. The flame plate includes simulated flame segments positioned to extend through slots in the grate. The grate is movable toward and away from the grate. A cam connected with a knob contacts the underside of the flame plate and moves the plate toward and away from the grate, simulating adjustment of the heat setting of the grill. The grill includes a port to hold the thermometer. The thermometer has a dial face at a proximal end and a probe at a distal end. The probe is biased in the distal direction and is movable inward and outward from a housing of the thermometer. A nut fixed with the probe engages a dial shaft within the thermometer housing. The dial shaft is rotatable about the central axis of the housing and engages with the nut. Movement of the probe, including the nut, relative to the dial shaft causes the shaft to rotate. An indicator needle at the proximal end of the dial shaft rotates across the dial face, simulating measuring a temperature of a food item.

13 Claims, 16 Drawing Sheets

(56) References Cited

U.S. PATENT DOCUMENTS

| | | | |
|---|---|---|---|
| D261,404 S | 10/1981 | Appel et al. |
| 4,307,539 A | 12/1981 | Klein |
| D263,612 S | 3/1982 | Snyder et al. |
| D269,022 S | 5/1983 | Appel et al. |
| D279,304 S | 6/1985 | Imatt et al. |
| D282,942 S | 3/1986 | Hartelius |
| D299,839 S | 2/1989 | Argandona |
| D303,691 S | 9/1989 | Wehmeyer |
| D327,717 S | 7/1992 | Thomson et al. |
| D350,167 S | 8/1994 | Klawitter |
| 6,459,851 B1 | 10/2002 | Sonu |
| 6,544,096 B1 | 4/2003 | Pyrce et al. |
| D490,862 S | 6/2004 | Hradisky |
| D919,715 S | 5/2021 | Bruggeman |
| 11,583,140 B1 | 2/2023 | Middleton |
| D1,004,713 S | 11/2023 | Zhong |
| 2009/0325462 A1 | 12/2009 | Cassidy |
| 2011/0271950 A1 | 11/2011 | Nilssen, III |
| 2015/0144238 A1 | 5/2015 | Traeger |
| 2017/0020334 A1 | 1/2017 | Sorenson et al. |
| 2019/0254478 A1 | 8/2019 | Ries |
| 2019/0381418 A1 | 12/2019 | Smith |
| 2023/0140662 A1 | 5/2023 | Bennett et al. |
| 2023/0276816 A1 | 9/2023 | Kellner |

FOREIGN PATENT DOCUMENTS

| | | |
|---|---|---|
| CN | 209630626 U | 11/2019 |
| CN | 307877158 | 2/2023 |
| EP | 015008051-0001 | 1/2023 |
| ES | 1016138 | 11/1991 |
| GB | 2035812 A | 6/1980 |
| GB | 6255309 | 1/2023 |
| JP | S58179197 U | 11/1983 |
| JP | H 09276563 A | 10/1997 |

OTHER PUBLICATIONS

Counting to ten, Nov. 5, 2022, "Review-Garden Kitchen Imaginative Play Toy By Smoby", Available from: http://www.countingtoten.co.uk/2022/05/review-smoby-garden-kitchen.html [Accessed Jan. 15, 2024] Assembly instructions by Smoby are available from: http://cdn.simba-dickie-group.de/downloads/3 12004/notice-garden-kitchen.pdf.

European Search Report in EP 23 19 4443, dated Mar. 20, 2024.

Examiner's Search Report in corresponding United Kingdom Application No. GB2313327.5, mailed Aug. 23, 2024, 2024. (2 pages).

Melissa and Doug BBQ grill toy, Amazon first available date May 24, 2023, https://www.Amazon.com/Melissa-Doug-30608-Barbeque-Grill/dp/B0BGQSNWYZ. (11 pages).

Costway Kids Grill Playset, Oriental Trading website 2023, site vistited Dec. 21, 2023, https://www.orientaltrading.com/costway-kids-barbecue-grill-playset-wooden-kitchen-playset-with-clip-4-bbq-poles-a2-14463952.fltr. (4 pages).

Partial European Search Report in EP 23 19 4443, mailed Jan. 8, 2024.

OUTDOOR GRILL TOY

BACKGROUND OF THE INVENTION

1. Field of the Invention

The present disclosure relates to a simulated outdoor grill that provides the experience of preparing food. More particularly, the present disclosure relates to an apparatus that simulates an outdoor grill including a simulated gas flame and a simulated thermometer that safely provides the user with the experience of preparing foods, such as grilled meats.

2. Description of the Related Art

Children enjoy playing games where they have the sensation that they are acting as adults. Toys such as simulated cash registers, retail stores, food kiosks, and other structures can provide children with the experience of performing a task normally reserved for adults. Such toys provide entertainment and allow children to mimic activities their parents perform. Playing games with such toys may help children develop skills such as attending carefully to the preparation food and may provide adults caring for children to teach them skills such as safely handling food and cooking devices.

The experience of a toy that simulates adult activities may be enhanced where the simulated activity is something children are normally not allowed to do. Toys that allow children to imaging they are driving a car or truck, sailing a boat, or flying a plane may provide a child with a more engaging experience because the activity is something they typically would not be allowed to do because it may be dangerous. Activities that involve using devices that include burning materials, very hot surfaces, smoke and the like may be particularly intriguing to a child.

There is a need for a toy that allows children the experience of operating cooking appliances to create foods, such as grilled foods. There is also a need for a toy that allows a child to pretend to properly prepare grilled foods including cooking such foods to a proper temperature.

BRIEF SUMMARY OF THE INVENTION

Embodiments of the disclosure provide a toy that includes a mechanism to simulate the preparation of food. According to one aspect, there is provided a simulated outdoor grill that a child can operate to cook foods over a flame. According to another aspect there is provided a simulated outdoor grill that includes a simulated thermometer that allows the child to pretend to monitor the temperature of the interior of the grill or to pretend to check the temperature of cooked food.

According to one embodiment, a toy is provided that comprises a housing simulating the lower portion of an outdoor gas grill. Legs may be provided to support the lower housing at a comfortable height for a child to pretend to cook food on the grill. A lid may be connected with the lower housing by one or more hinges. A handle may be provided on the front exterior of the lid that allows the lid to be lifted and to rotate about the hinges to open the grill to allow the child to access the interior of the grill. The lower housing may include a grate with a plurality of slots arranged to look like the grate of a gas barbeque grill.

According to one embodiment, the barbeque grate includes features that simulate cooking over an open flame. Positioned below the grate is a flame plate. The flame plate includes a plurality of simulated flame segments. The flame segments are positioned to fit into the plurality of slots on the grate and sized to extend through respective ones of the plurality of slots when the flame plate is moved upward toward the grate. Slidable supports extend downward from the housing and engage with openings in the flame plate to support and guide the flame plate to move toward and away from the grate. Positioned below the flame plate is a cam shaft and one or more cams. Rotation of the cam shaft moves the cams against a lower side of the flame plate. Rotation of the cam shaft in one direction causes the flame plate to move upward along the slidable supports toward the grate. Rotation of the cam shaft in the opposite direction causes the flame plate to descend along the slidable supports away from the grate. As the flame plate moves upward, flame segments extend into and through respective ones of the slots of the grate.

According to one embodiment, a knob is connected with the cam shaft. The knob is positioned on an outside front surface of the housing and is accessible to a child playing with the device. The knob may have markings simulating the controls of a gas barbeque grill, for example, "start," "high," "medium," and "low" as might be found on a real outdoor grill.

According to one embodiment, flame segments on the flame plate include a plurality of differently colored regions to simulate the colors of an actual gas flame.

According to a further embodiment, the lid may include a port shaped to hold a simulated thermometer.

According to another embodiment, there is provided a simulated thermometer for use with the simulated outdoor grill. The thermometer may be shaped to be removably received in the port on the grill. According to one embodiment, the thermometer is formed from a housing with a dial face at a proximal end and extends in a distal direction along a longitudinal axis. The housing defines an inner cavity. A dial shaft extends through the dial face along the longitudinal axis through the cavity. The dial shaft is held within the housing so that it is fixed axially but rotates about the longitudinal axis. The distal end of the housing has an opening. A probe is fitted into the opening and arranged to slide into and out from the opening. The probe defines an interior probe cavity arranged along the longitudinal axis.

According to one embodiment the dial shaft includes a cam peg extending from the shaft perpendicular to the longitudinal axis. A helical cam groove is provided along the interior surface of the probe cavity. The cam peg of the dial shaft is slidably engaged with the cam groove.

The housing includes a proximal spring receiver toward the proximal end of the housing cavity. The probe includes a rim at its proximal end that forms a distal spring receiver. A spring, such as a coil spring, is provided between the proximal and distal spring receivers. A force applied to the probe to move it in the proximal direction into the housing compresses the spring. When the force is removed, the resilient force of the spring drives the probe in the distal direction. Stops are provided at the proximal end of the probe and at the distal end of the housing to prevent the probe from completely exiting the case cavity. Movement of the probe into and out from the housing causes the cam peg to move along the helical groove and drives the dial shaft to rotate about the longitudinal axis.

According to another embodiment the dial shaft comprises a threaded outer surface. The probe comprises a nut shaped to engage the threaded dial shaft. The nut is rotationally fixed with respect to the probe at the proximal end of the probe. A bearing is fitted to the distal end of the dial shaft. The distal end of the dial shaft extends through the nut with the bearing positioned distal of the nut and within the interior of the probe. A spring or other biasing member is positioned within the probe between a distal interior end of the probe and the bearing to provide a force biasing the probe distally. Force applied to the probe in the proximal direction drives the probe into the outer housing, moving the nut axially along the dial shaft, causing the dial shaft to rotate relative to the outer housing.

According to one embodiment, an indicator needle is provided at the proximal end of the dial shaft. The indicator needle extends above the dial face. Rotation of the dial shaft driven by the movement of the cam peg along the helical groove causes the indicator to rotate across the dial face. By moving the probe inward of the housing by different distances, the position of the indicator relative to the dial face is varied.

According to one embodiment, the probe includes a probe tip at its distal end. The housing includes a shoulder at its distal end with the probe tip extending distally of the shoulder. According to one embodiment, a user presses the probe tip against a surface, for example, a simulated food item such as a simulated piece of meat or vegetable place on the grate causing the probe tip to move proximally with respect to the body. This allows the user to simulate testing the temperature of a food item being cooked. According to a further embodiment, a simulated food item such as a piece of meat includes on or more blind holes. The holes are sized to allow the probe tip to extend below the surface of the food item with the shoulder pressed against the surface of the food item. The depth of the hole allows the probe tip to extend a preselected distance from the shoulder, causing the dial shaft to rotate and moving the indicator across the dial face until it points to a selected simulated temperature. According to a further embodiment, the food item includes a plurality of blind holes, each with a different depth. The user can insert the probe tip into different holes, causing the indicator to point to different temperatures, for example, indicating that the simulated food item is cooked to a "rare," a "medium", or a "well-done" temperature.

According to another aspect of the disclosure, the structure is formed from components that are simple to manufacture and assemble.

According to another aspect of the disclosure, toys embodying the disclosed structure are lightweight and easy to store and transport.

According to another aspect of the disclosure, toys embodying the disclosed structure are durable.

According to one embodiment of the disclosure, there is provided a simulated cooking appliance (1) comprising: a grill housing (5); a grate (12) fitted into the grill housing, the grate comprising a plurality of slots (12a); and a flame plate (14) comprising a plurality of simulated flame segments (14a), wherein the flame plate is supported by the grill housing (5) adjacent the grate (12), wherein each of the plurality of flame segments (14a) is aligned with a respective one of the plurality of slots (12a); and wherein the flame plate is moveable toward and away from the grate. The appliance may further comprise a slidable support (16) and a one or more rotatable cams (20a, 20b), wherein the slidable support (16) connects the flame plate (14) with the grill housing to allow the flame plate to move toward and away from the grate, wherein the rotatable cams (20a, 20b) are in sliding contact with the flame plate (14), and wherein rotation of the cams in a first direction causes the cams to move the flame plate toward the grate and rotation in a second direction causes the cams to move the flame plate away from the grate. Each of the plurality of flame segments (14a) may comprise one or more decorated regions (14a'), wherein the decorated regions simulate a flame and wherein, when the flame plate is moved toward the grate, portions of the decorated regions (14a') are visible above the grate (12) to simulate a flame extending into or through the grate. The appliance may further comprise a knob (22) connected with a cam shaft (18), wherein the cams (20a, 20b) are fixed with the cam shaft and wherein rotation of the knob rotates the cam shaft and the cams in the first and second directions. The appliance may further comprise a lid (3) connected with the grill housing (5) by one or more hinges (6), wherein rotation of the lid (3) about the hinges opens and closes the lid relative to the grill housing. The appliance may further comprise a simulated thermometer (100) and the lid (3) may further comprise a thermometer port (8), wherein the simulated thermometer removable fits into the thermometer port. The lid (3) and grill housing (5) may be shaped to simulate one or more of a barbeque grill, a pizza oven, an electric oven, a gas cooktop, a coal-fired oven, and a wood-fired oven.

According to another embodiment of the disclosure there is provided a simulated thermometer (100) comprising: a thermometer housing (119) having a dial face (121) at a proximal end thereof, wherein the thermometer housing extends in a distal direction, wherein the thermometer housing encloses a housing cavity (104) arranged along a longitudinal axis; a dial shaft (117) disposed concentrically within the housing cavity (104) along the longitudinal axis and rotatably connected with the thermometer housing (119); a cam peg (107) extending from the dial shaft (117); a probe (109) defining a probe cavity (110), wherein the probe extends in the distal direction along the longitudinal axis, wherein a distal portion of the dial shaft (117) is positioned concentrically within the probe cavity (110) and wherein a proximal portion of the probe (109) is positioned concentrically within a distal portion of the housing cavity (104), and wherein the probe (109) is slidable along the longitudinal axis in a proximal direction and a distal direction respectively into and out from the thermometer housing (119) and is rotationally fixed with respect to the thermometer housing (119); a helical cam groove (111) arranged along an inner surface of the probe cavity (110), wherein the cam peg (107) is slidably received in the helical cam groove (111) and wherein motion of the probe in the proximal and distal directions causes the helical cam groove to drive the dial shaft to rotate about the longitudinal axis; and a biasing mechanism (115) arranged between the housing and the probe, wherein the biasing mechanism applies a resilient force to bias the probe in the distal direction. The thermometer housing may further comprise a proximal spring receiver (106) extending inward of the housing cavity (104), the probe may further comprise a distal spring receiver (113), wherein the biasing mechanism is a spring (115) disposed between the proximal spring receiver and the distal spring receiver.

According to a further embodiment of the disclosure there is provided a simulated thermometer (100) comprising: a thermometer housing (119) having a dial face (121) at a proximal end thereof, wherein the thermometer housing extends in a distal direction, wherein the thermometer housing encloses a housing cavity (104) arranged along a longitudinal axis; a dial shaft (217) disposed concentrically within the housing cavity (104) along the longitudinal axis and rotatably connected with the thermometer housing (119), wherein an outer surface of the dial shaft comprises threads (217a); a probe (109) defining a probe cavity (110), wherein the probe extends in the distal direction along the longitudinal axis, wherein a distal portion of the dial shaft (217) is positioned concentrically within the probe cavity (110) and wherein a proximal portion of the probe (109) is positioned concentrically within a distal portion of the housing cavity (104), and wherein the probe (109) is slidable along the longitudinal axis in a proximal direction and a distal direction respectively into and out from the thermometer housing (119) and is rotationally fixed with respect to the thermometer housing (119); a nut (211) fixed with the probe cavity (110) and engaged with the thread (217a) and wherein motion of the probe in the proximal and distal directions causes the engagement of the thread (217a) and the nut (211) to drive the dial shaft to rotate about the longitudinal axis; and a biasing mechanism (115) arranged between a distal end of the dial shaft and a distal interior surface of the probe, wherein the biasing mechanism applies a resilient force to bias the probe in the distal direction. The thermometer housing may further comprise a bearing (206) rotationally engaged with a distal end of the housing shaft, wherein the biasing mechanism is a spring (115) disposed between the bearing and the distal interior surface of the probe.

The thermometer may further comprise an indicator (105) connected the dial shaft (117) and a dial case (120) at a proximal end of the thermometer housing, wherein the dial face (121) and indicator (105) are disposed in the dial case, wherein rotation of the dial shaft (117) in the first or second direction causes the indicator (105) to rotate within the dial case (120). The dial face 121 may comprise a plurality of simulated temperature indicia (122). The thermometer may further comprise a viewing window (124) connected with the dial case (120), wherein the indicator (105) and the indicia are visible within the dial case through the viewing window (124). The thermometer housing (119) may further comprise a shoulder (125) at a distal end of the thermometer housing (119), the probe (109) may further comprise a probe tip (123) at a distal end of the probe, wherein the probe tip (123) extends from the thermometer housing (119) distal of the shoulder (125), and wherein movement of the probe (109) proximally and distally relative to the thermometer housing (119) comprises movement of the probe tip (123) relative to the shoulder (125) along the longitudinal axis. The thermometer may further comprise a simulated food item (200), wherein the simulated food item comprises: an outer surface (204); and one or more blind holes (202a, 202b, 202c) extending through the outer surface and into the food item (200) and sized to accept insertion of the probe tip (123). A depth of the blind hole (202a, 202b, 202c) may be selected so that, when the probe tip (123) is inserted into the blind hole and contacts a bottom surface (206a, 206b, 206c) of the hole and the shoulder (125) of the thermometer housing contacts the outer surface (204), the probe is displaced in the proximal direction a selected distance along the longitudinal axis to cause the dial shaft (117) to rotate the indicator (105) to point to a selected one of the plurality of temperature indicia (122). The one or more holes may comprise a plurality of blind holes (202a, 202b, 202c), wherein each of the plurality of blind holes has a different depth and wherein, when the probe tip (123) is inserted into a selected one of the blind holes, a different selected temperature indicia (122) is pointed to by the indicator (105).

BRIEF DESCRIPTION OF THE DRAWINGS

The above and/or other aspects of the disclosure will be more apparent by describing in detail exemplary embodiments of the disclosure with reference to the accompanying drawings, in which.

DETAILED DESCRIPTION OF EXEMPLARY EMBODIMENTS

Figure 1A:
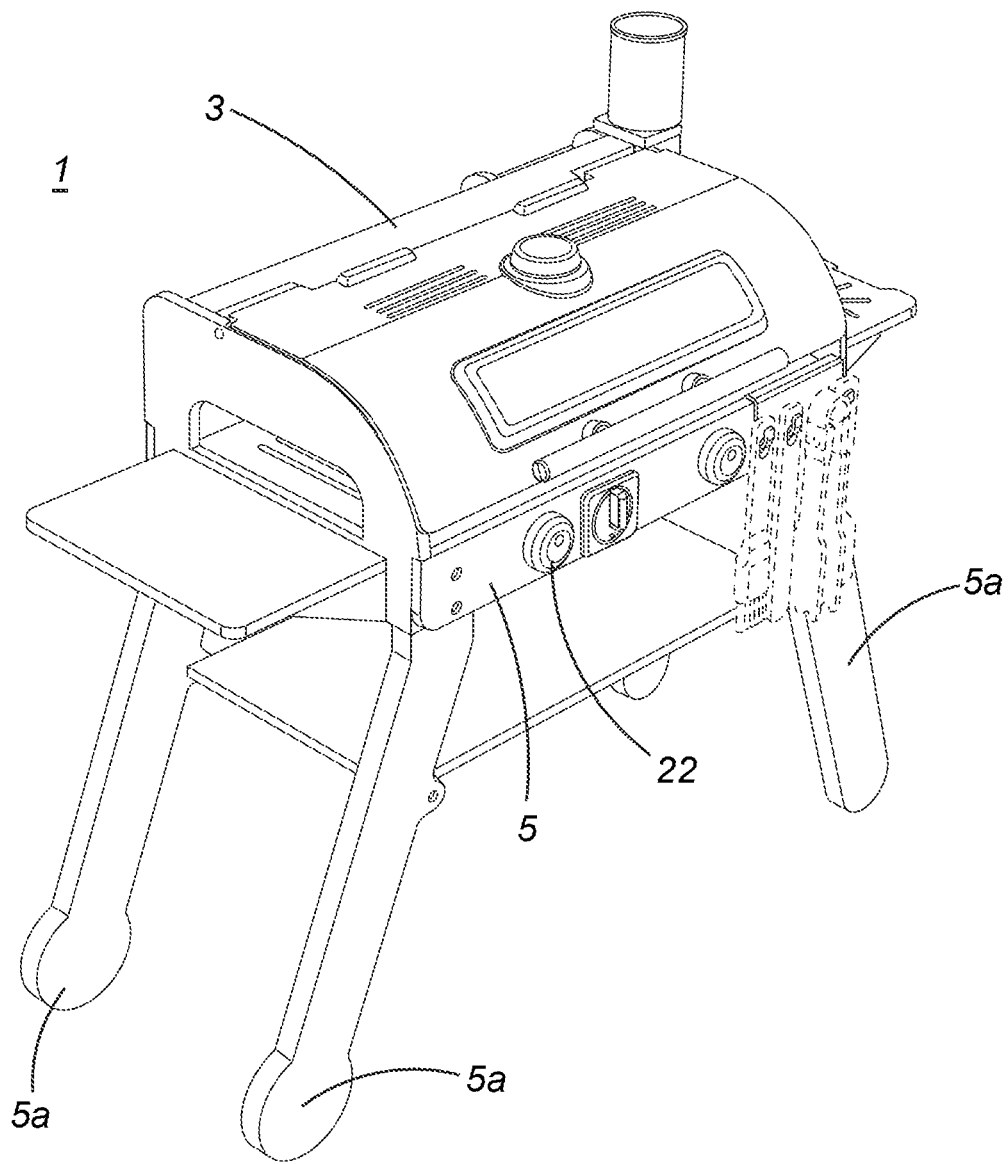
FIGS. 1A and 1B are perspective views of a simulated barbeque grill according to embodiments of the disclosure.

Exemplary embodiments of the disclosure will now be described below by reference to the attached Figures. The described exemplary embodiments are intended to assist the understanding of the invention and are not intended to limit the scope of the invention in any way. Like reference numerals refer to like elements throughout.

The term "distal" refers to the direction away from a user operating apparatus according to the disclosure. The term "proximal" refers to the direction toward a user operating apparatus according to the disclosure.

Figure 1B:
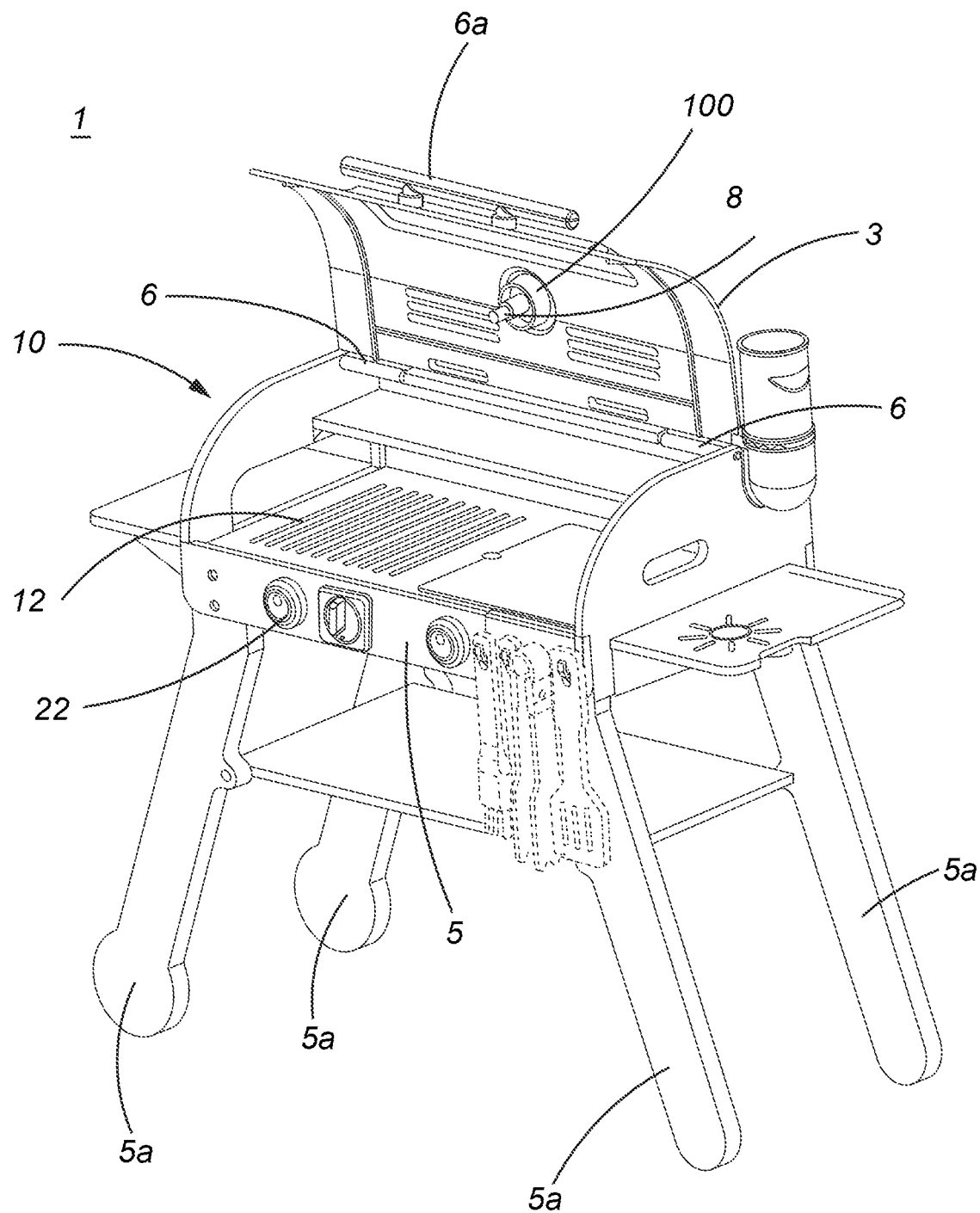

FIGS. 1A and 1B show a toy 1 according to one embodiment of the disclosure. In this exemplary embodiment, the toy simulates an outdoor gas grill. A grill body 5 is connected with a lid 3. As shown in FIG. 1B, lid 3 is connected with body 5 by one or more hinges 6. Lifting handle 6a may be provided on the front surface of the lid to facilitate lifting the lid 3 from the body 5. According to one embodiment, a thermometer port 8 is provided through the lid 3. As will be explained below, a simulated thermometer 100 is sized and shaped to be removably received in the thermometer port 8. Legs 5a may be provided to support body 5 at a comfortable height. The disclosure is not limited to an outdoor gas grill. Other types of simulated cooking appliances are also within the scope of the disclosure. Instead of, or in addition to a gas grill, a toy within the scope of the disclosure may also include a pizza oven, an electric oven, a cooktop, a coal-fired oven, a wood-fired oven, and the like.

Figure 2A:
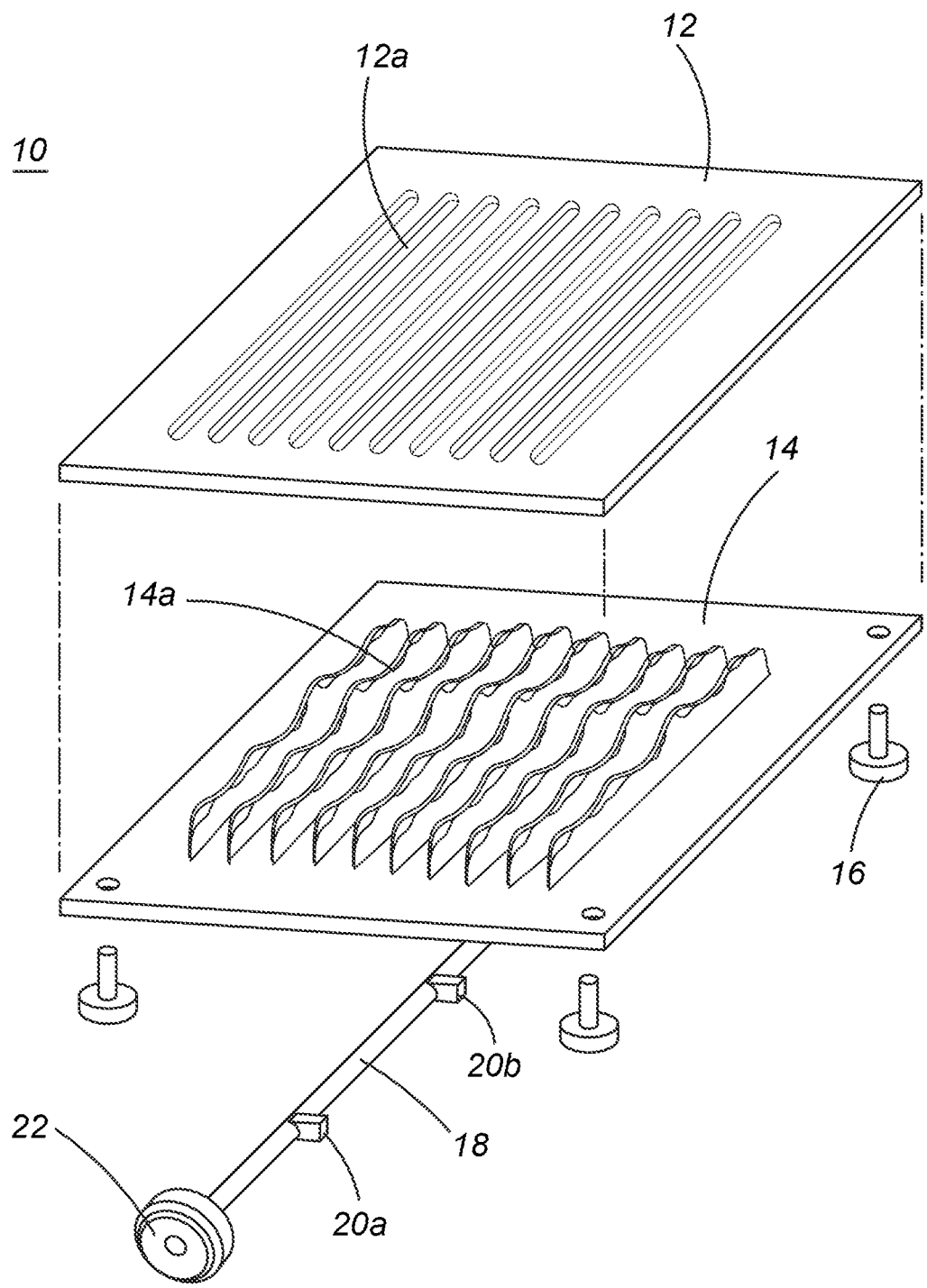
FIG. 2A is an exploded view of a grill assembly of the simulated barbeque grill of FIGS. 1A and 1B.
Figure 2B:
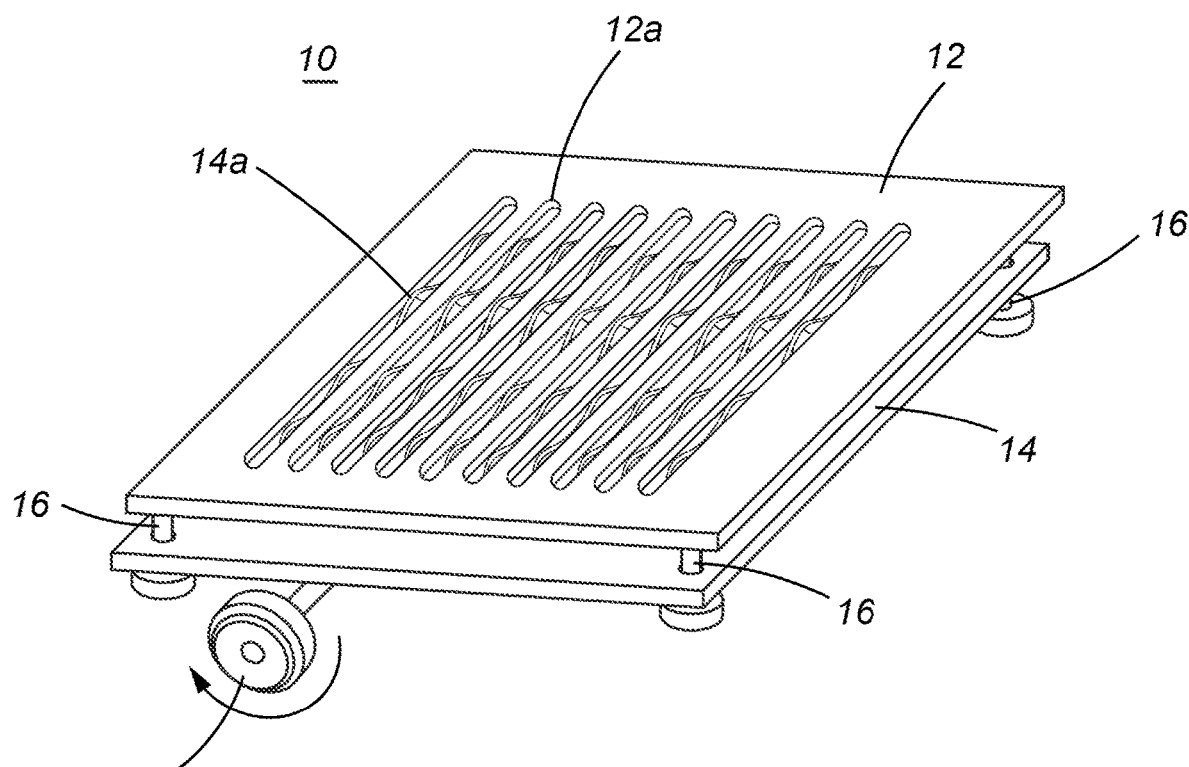
FIGS. 2B and 2C show the grill assembly of FIG. 2A with a flame plate lowered and raised, respectively.
Figure 2C:
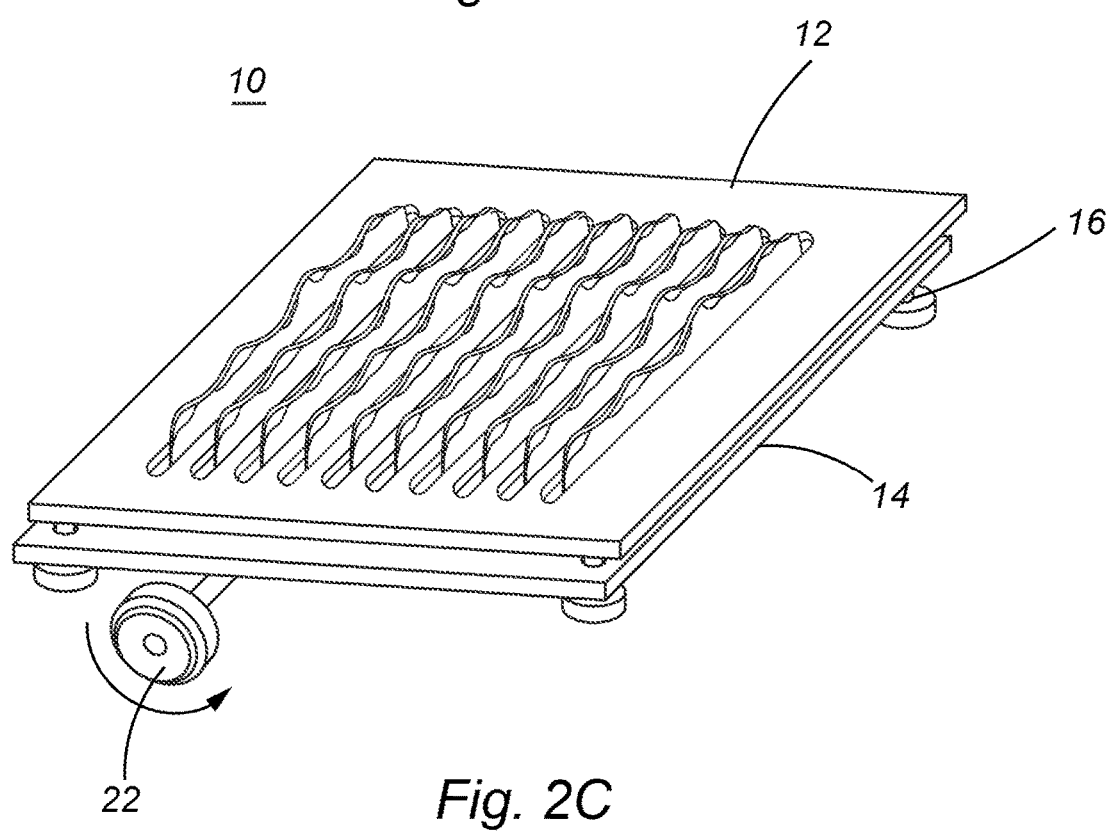

As shown in FIG. 1B, a grill assembly 10 is provided on the top surface of body 5. FIG. 2A shows an exploded view of grill assembly 10 according to one embodiment of the disclosure. FIGS. 2B and 2C show grill assembly 10 of FIG. 2A with a simulated flame 14a turned down (i.e., "low temperature") and turned up (i.e., "high temperature"), respectively. As shown in FIG. 2A, grill assembly is formed from a grate 12. As can be seen in FIG. 1B, grate 12 forms part of the top surface of body 5. Grate 12 includes a plurality of slots 12a that are shaped to resemble the cooking surface of a barbeque grill, such as a gas grill. Positioned below grate 12 is a flame plate 14. A plurality of simulated flame segments 14a are provided on flame plate 14. The flame segments 14a are shaped and positioned to align with slots 12a. According to one embodiment, shafts 16 are fixed to the bottom of grate 12 or to a downward facing portion of grill body 5 and extend downward. Flame plate 14 includes through holes that correspond to the positions of shafts 16. Shafts 16 extend through the through holes and are sized to allow flame plate 14 to slide up and down relative to grate 12. Shafts 16 may include heads or stops that prevent flame plate 14 from sliding off of the shafts and disconnecting from grate 12. In the embodiment of FIG. 2A, four such shafts 16 are provided. A greater or fewer number of shafts may be used within the scope of the disclosure. According to other embodiments, instead of, or in addition to shafts 16 extending through holes in flame plate 14, other mechanisms may be used to guide flame plate to move upward and downward with respect to grate 12. According to one embodiment, edges of flame plate 14 are enclosed by walls that constrain lateral movement of the flame plate 14 but allow the plate to move up and down along the walls.

Positioned below flame plate 14 is cam shaft 18. One or more cams 20a, 20b are fixed with cam shaft 18. Rotation of cam shaft 18 causes cams 20a, 20b to rotate against the bottom surface of flame plate 14, moving flame plate 14 upward and downward with respect to grate 12. Cam shaft is supported by bearings (not shown) so that cam shaft 18 and cams 20a, 20b can rotate with respect to body 5. According to one embodiment, knob 22 is provided on an end of cam shaft 18. As shown in FIGS. 1A and 1B, knob 22 extends from a front side of body 5. Knob 22 may include a pointer or markings and body 5 may include corresponding markings to show a simulated temperature setting (e.g., "start," "low," "medium," and "high" heat setting for the grill).

Figure 3A:
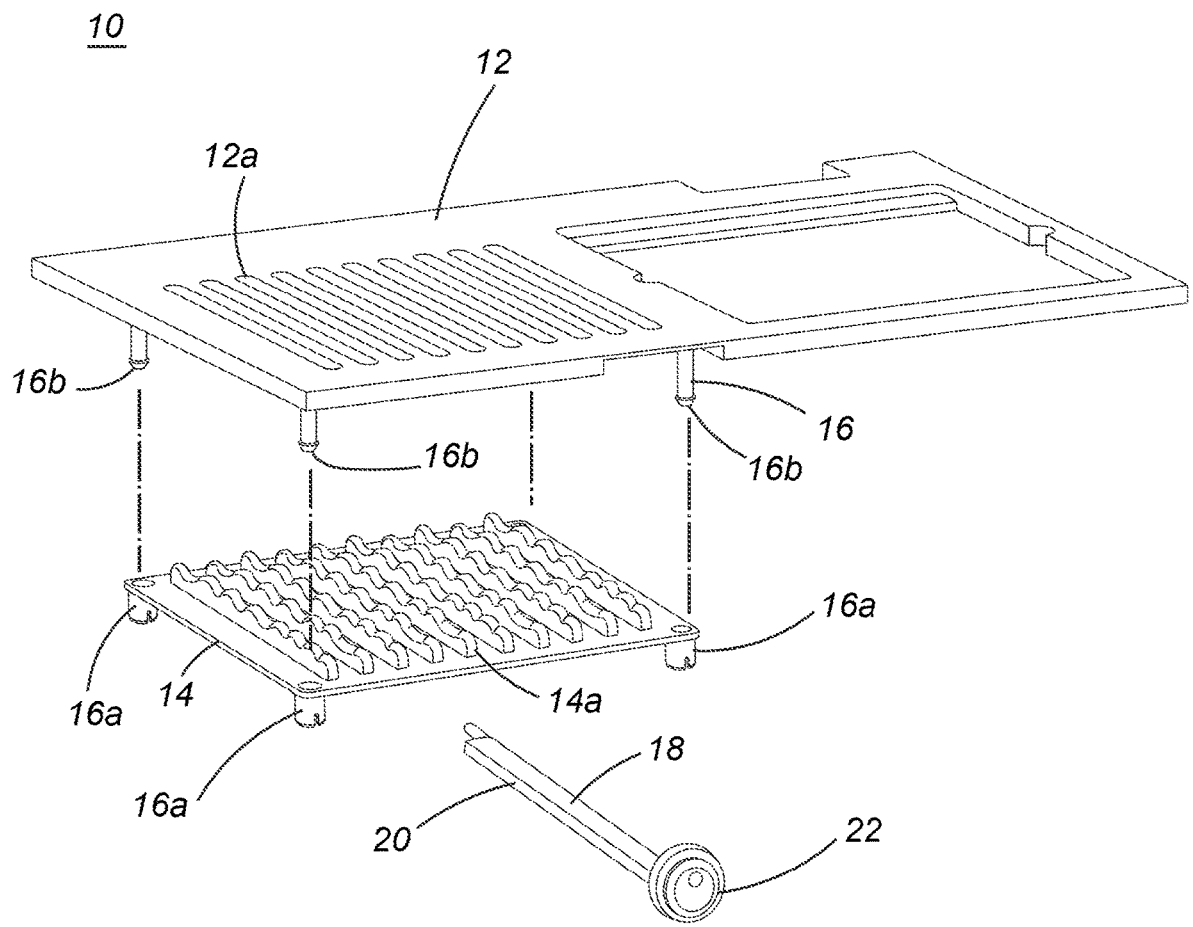
FIG. 3A is an exploded view of a grill assembly according to a further embodiment of the disclosure.
Figure 3B:
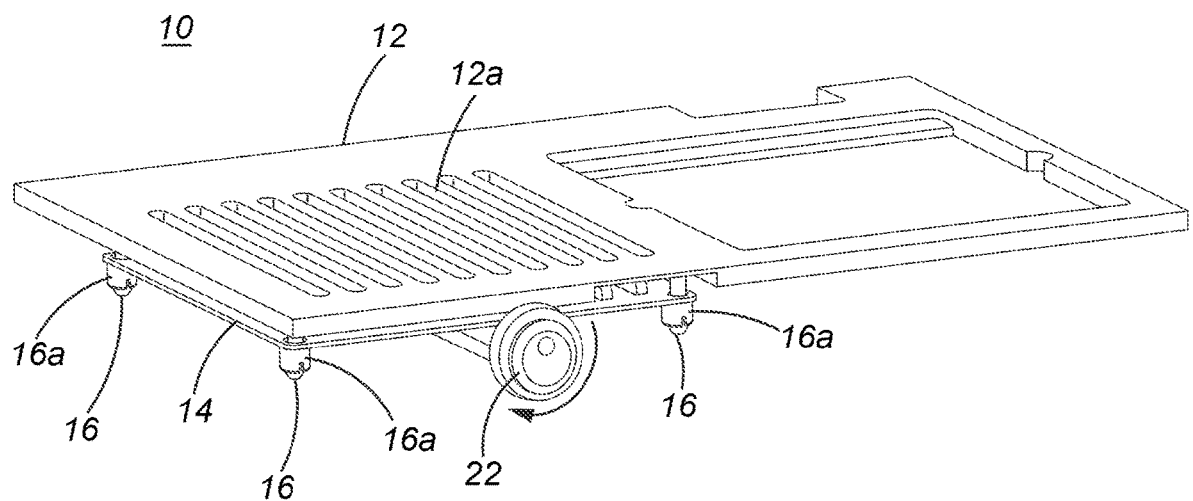
FIG. 3B is a perspective view of the grill assembly of FIG. 3A.

FIG. 3A shows an exploded view of grill assembly 10 according to an another embodiment of the disclosure. FIG. 3B is a perspective view of grill assembly 10 according to the embodiment of FIG. 3A. As with the previous embodiment, grill assembly 10 is formed from a grate 12 that forms part of the top surface of body 5. Grate 12 includes a plurality of slots 12a that are shaped to resemble the cooking surface of a barbeque grill, such as a gas grill. Positioned below grate 12 is a flame plate 14. A plurality of simulated flame segments 14a are provided on flame plate 14. The flame segments 14a are shaped and positioned to align with slots 12a. Extending downward from the underside of grate 12 are shafts 16. Shafts 16 include widened portions 16b at their bottommost ends. Flame plate 14 includes bosses 16a surrounding through holes. Bosses 16a define openings with diameters that are smaller than the widened portions 16b of shafts 16 and larger than shafts 16 above widened portions 16b. Bosses 16a are resiliently deformable so that, when widened portions 16b are pressed against the bosses, the openings of the bosses widen to allow widened portions 16b to pass through. Once shafts 16 are pressed through bosses 16a, the bosses resiliently rebound, preventing widened portions 16b from passing back through the holes, thus capturing flame plate 14 on shafts 16. Because bosses 16a define opening that are larger than the shafts, flame plate 14 can move vertically along the shafts relative to the grate 12, as in the embodiments described with respect to FIGS. 2A, 2B, and 2C. According to one embodiment, widened portions 16b are pointed or include ramped surfaces at their bottommost ends to facilitate alignment with bosses 16a and to facilitate the expansion of the bosses as shafts 16 are inserted into bosses 16a.

As shown in FIG. 3A, knob 22 is connected with cam shaft 18. In this embodiment, cam shaft 18 is formed as a single unitary piece with a cam portion 20 offset from the rotational axis of the cam shaft 18. Cam portion 20 is offset from the rotational axis of knob 22. Rotation of cam shaft 18 by turning knob 22 causes the cam portion 20 to contact the bottom surface of flame plate 14 to move flame plate 14 up and down with respect to grate 12, in the same manner as described with respect to FIGS. 2B and 2C. FIG. 3B shows knob 22 turned so that cam portion 20 is turned away from flame plate 14, allowing the flame plate to move downward away from grate 12. In this position flame segments 14 are positioned below grate 12, as if the grill assembly 10 is set at a "low" temperature.

Figure 4:
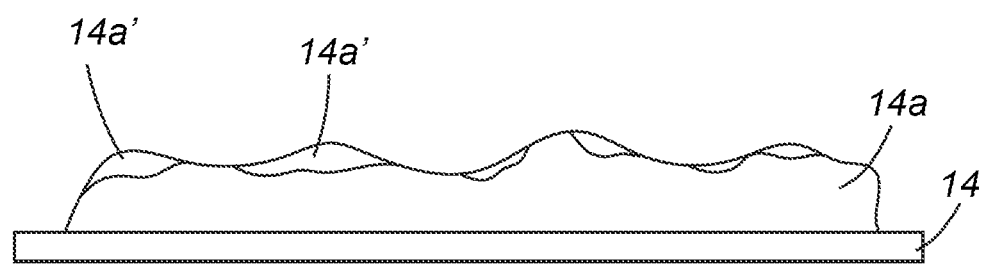
FIG. 4 is a detailed view of a simulated flame segment of the grill assembly of FIG. 2A.

As shown in FIG. 4, flame segments 14a may include decorations to simulate the shape and color of flames that will appear to emerge from grate 12 when flame plate 14 is moved upward by turning knob 22. For example, different colored and/or textured regions 14a' may be provided to simulate orange, yellow, and blue regions typically associated with gas flames on a real gas grill. By adjusting knob 22, different portions of flame segments 14a are made visible through grate 12, simulating adjustment of a barbeque grill. According to other embodiments, the simulation of flames emerging from grate 12 may also include colored fabric portions driven to move by a fan or other supply of moving air to simulate the pulsation of gas flames.

Figure 5:
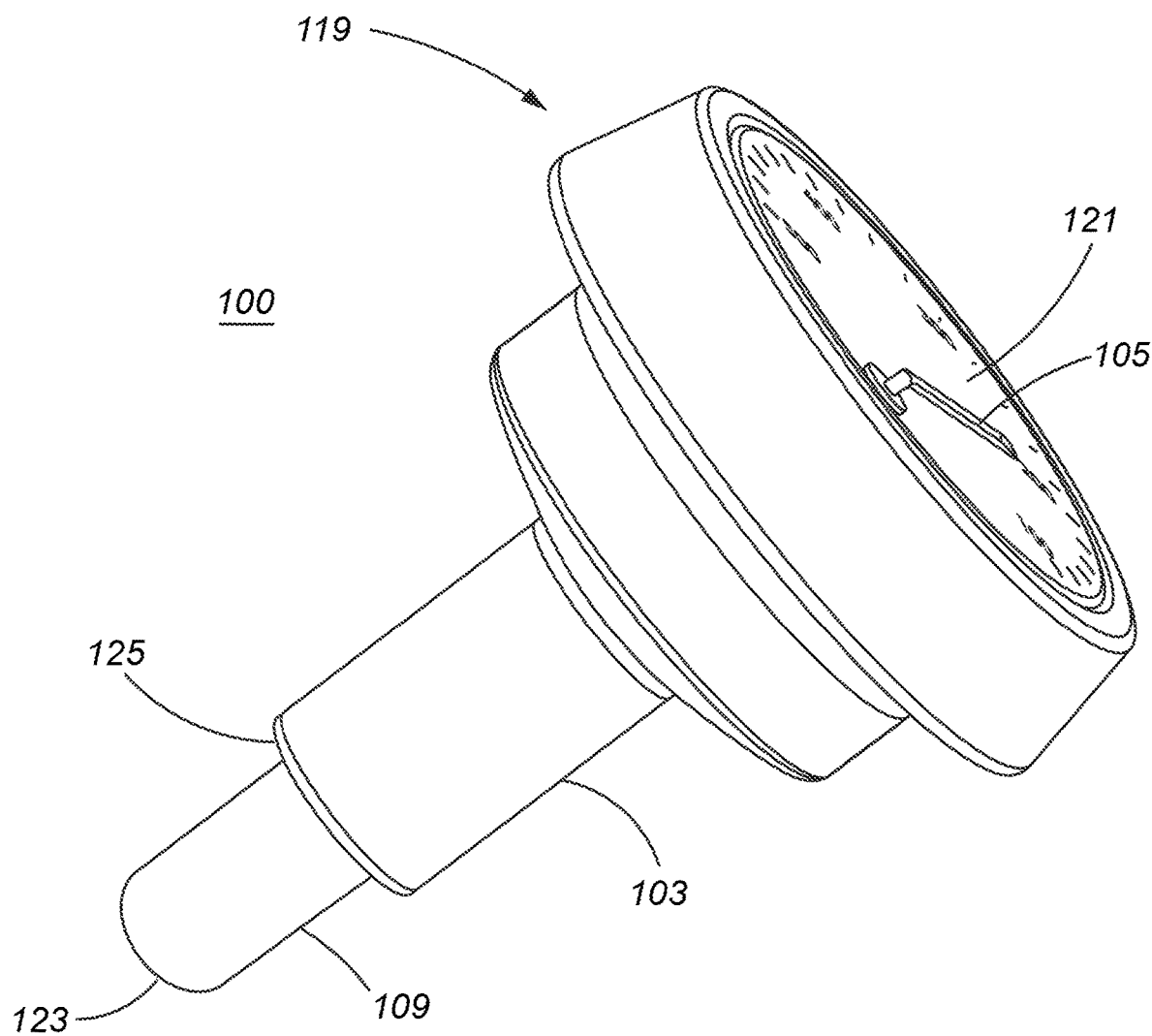
FIG. 5 is a perspective view of a simulated thermometer according to another embodiment of the disclosure.

FIG. 5 shows a perspective view of a simulated thermometer 100 according to a further embodiment of the disclosure. Thermometer housing 119 includes a dial face 121 at a proximal end. Outer shaft 103 extends distally from housing 119. Outer shaft 103 may be sized to removably fit in thermometer port 8 in lid 3 of grill 1, as described above. Extending from outer shaft 103 is probe 109. At the distal end of probe 109 is probe tip 123. According to one embodiment, a shoulder 125 may be provided at the distal end of outer shaft 103.

Figure 6A:
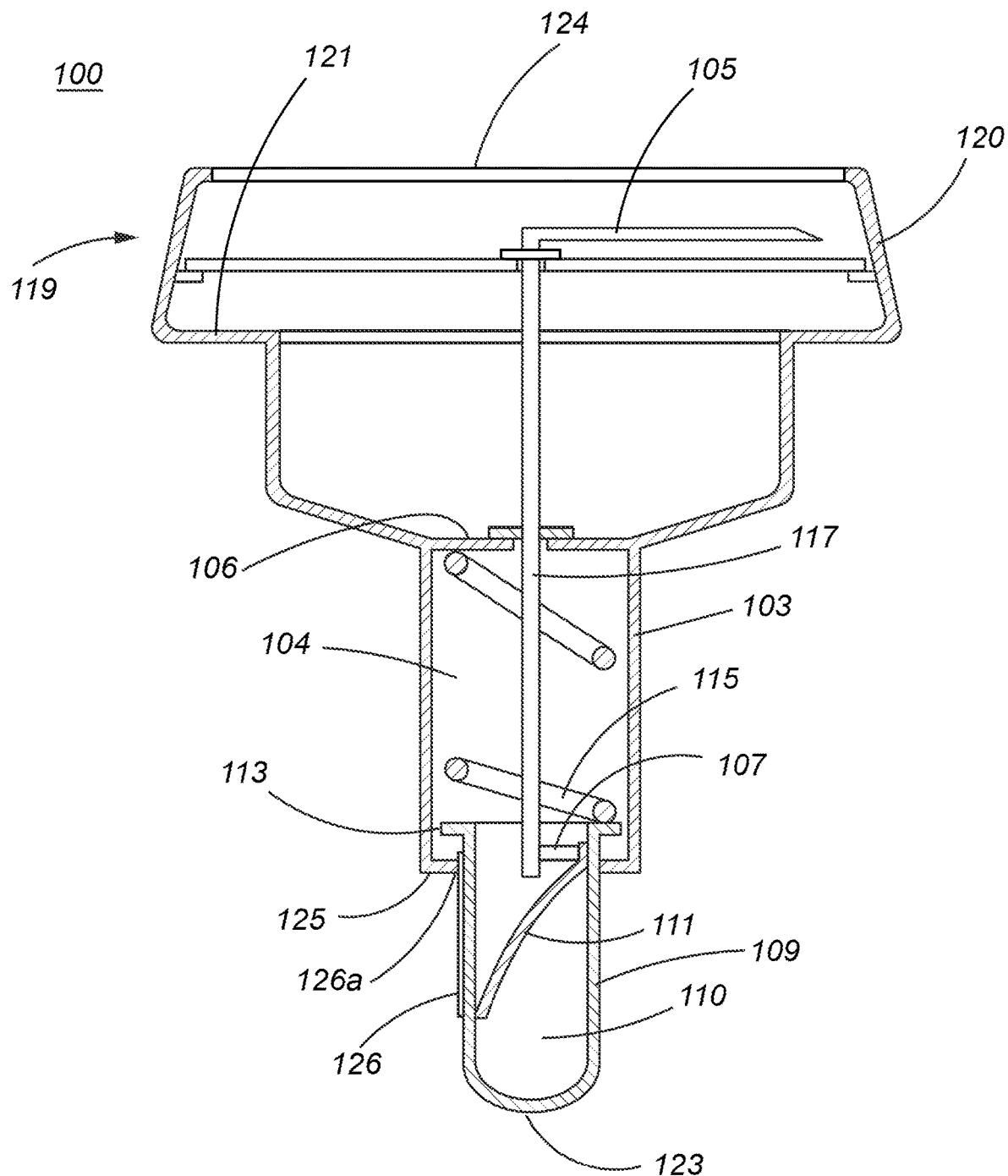
FIGS. 6A and 6B are cross sectional views of the thermometer of FIG. 5.

FIG. 6A shows a cross section view of thermometer 100. Dial shaft 117 is provide along a central longitudinal axis of housing 119. Dial shaft 117 is rotatable about the central axis but is fixed axially. According to one embodiment, one or more bearings (not shown) are provided to hold shaft 117 axially and allow it to rotate about the longitudinal axis. Near the distal end of shaft 117 is cam follower 107. Cam follower 107 extends away from shaft 117 perpendicular to the central axis of housing 119. Probe 109 includes a probe cavity 110. Helical cam slot 111 is provided on the inside surface of probe 109. Cam follower 107 is engaged with helical cam slot 111.

Probe 109 is slidably connected with housing 119 so that probe 109 can slide proximally into housing 119 and distally outward from housing 119. Probe 109 is prevented from rotating with respect to housing 119. According to one embodiment, a key 126 extends axially along the outer surface of probe 109. Key 126 engages with key slot 126a on an inside surface of shoulder 125. Engagement of key 126 with key slot 126a allows probe 109 to slide proximally and distally with respect to housing 119 but remain rotationally fixed. A rim 113 may be provided at the proximal end of probe 109 within housing 119. Rim 113 interacts with the proximal surface of shoulder 125 to prevent probe 109 from exiting housing 119 in the distal direction.

Figure 6B:
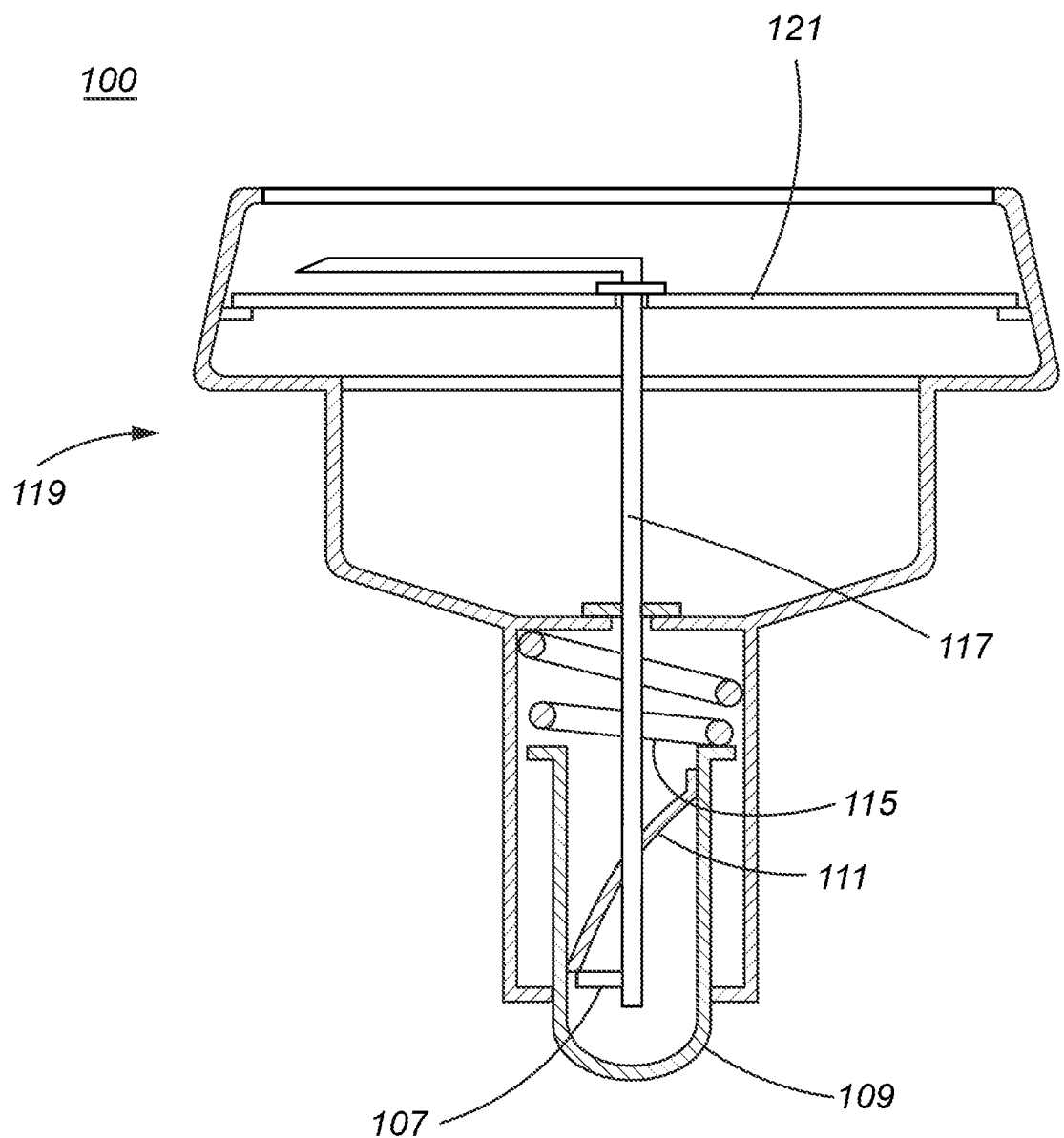

Spring 115 is provided within housing 119 to provide an elastic force biasing probe 109 in the distal direction. According to one embodiment, spring 115 is a coil spring. The proximal end of spring 115 rests against the distal surface of proximal spring receiver 106. The distal end of spring 115 rests against the proximal surface of rim 113 which forms a distal spring receiver. When probe 109 is fully extended in the distal direction from housing 119 spring is slightly compressed to provide a constant restoring force holding rim 113 against the proximal surface of shoulder 125. When force is applied to probe 109, for example, by pressing probe tip 123 against a surface, probe 109 moves proximally into housing 119, compressing spring 115. Proximal motion of probe 109 relative to housing 119 causes helical cam slot 111 to move axially relative to cam follower 107. Cam follower 107 moves along helical cam slot 111, causing dial shaft 117 to rotate. FIG. 6B shows probe 109 pressed fully in the proximal direction. According to one embodiment, the pitch of helical cam slot 111 is selected so that, when cam follower 107 moves from the proximal end of slot 111 to the distal end of slot 111, dial shaft turns thought between about 90 degrees and about 360 degrees.

At the proximal end of housing 119 is dial case 120. Dial face 121 is provided within dial case 120. According to one embodiment, a clear window 124 forms the proximal surface of dial case 120. Indicator needle 105 is attached to dial shaft 117. Rotation of dial shaft 117 causes indicator needle 105 to rotate within dial case 120 and across dial face 121. FIG. 6B shows thermometer 100 with probe 109 pressed fully in the proximal direction, with cam follower 107 at the distal end of helical cam slot 111. Spring 115 is shown in a compressed condition. Indicator needle 105 has rotated to a different position with respect to dial face 121 from the position shown in FIG. 6A.

Figure 7A:
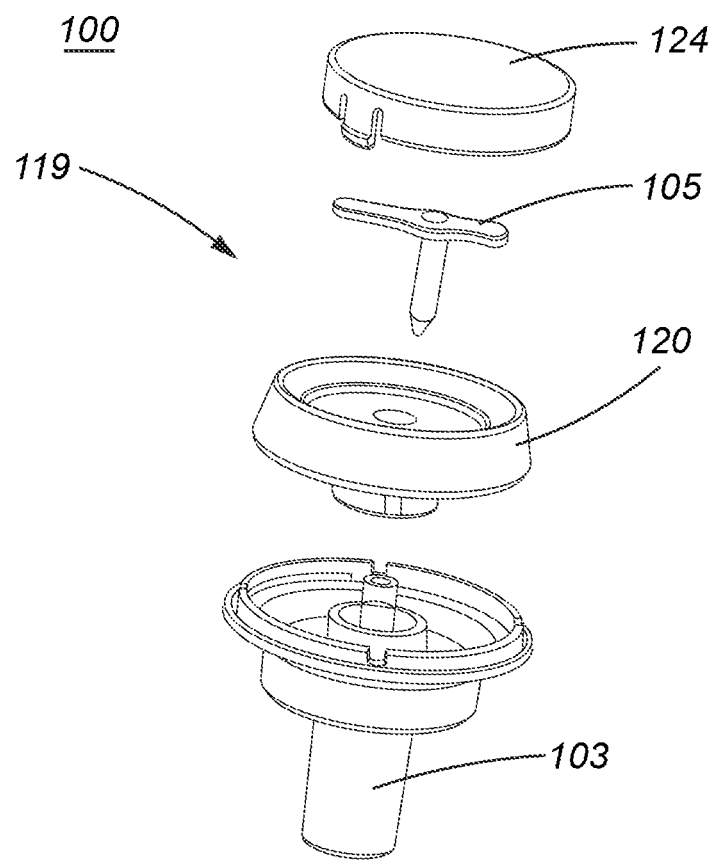
FIG. 7A is an exploded view of a simulated thermometer according to a further embodiment of the disclosure.
Figure 7A:
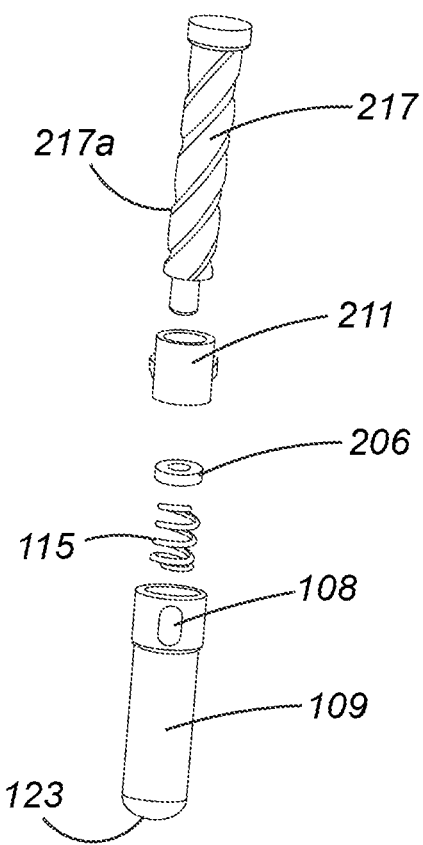
Figure 7B:
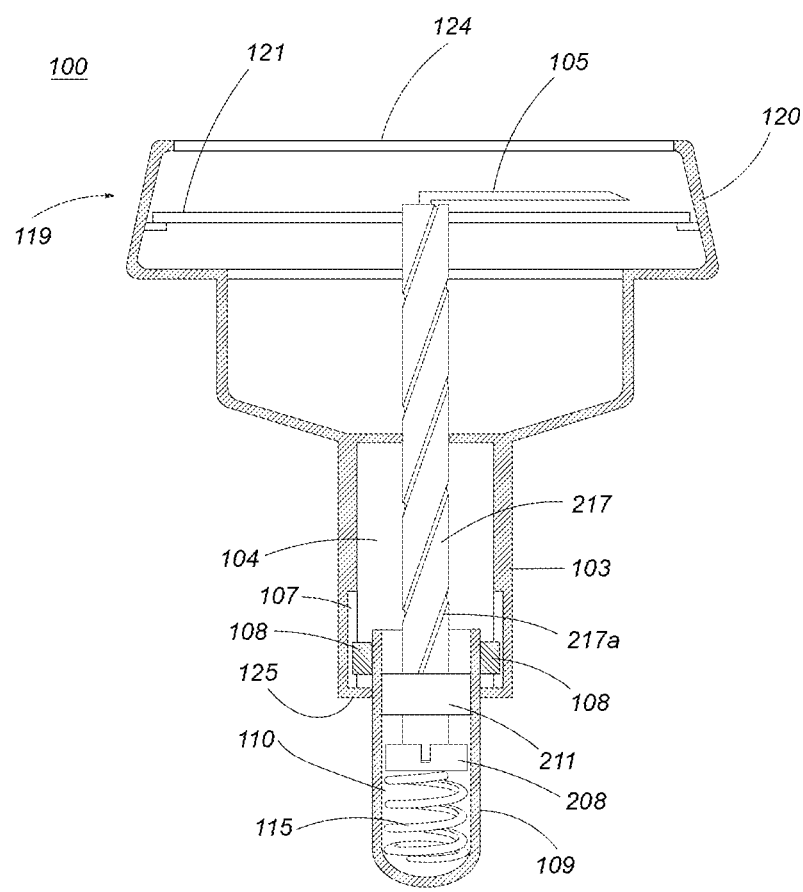
FIG. 7B is a cross section view of the simulated thermometer of FIG. 7A.
Figure 7C:
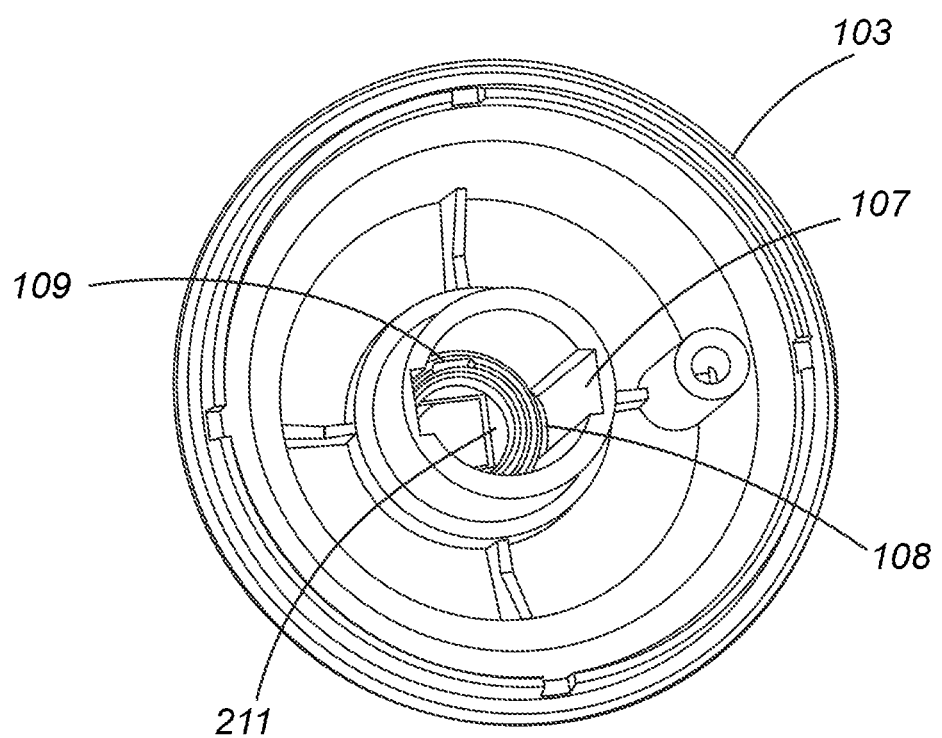
FIG. 7C is a top view of the simulated thermometer illustrating the engagement of a probe with an outer housing.

FIG. 7A is an exploded view of a simulated thermometer 100 according to another embodiment of the disclosure. FIG. 7B shows a cross section view of the thermometer 100 of FIG. 7A. FIG. 7C shows the engagement of probe 109 with outer housing 103.

Dial shaft 217 is connected with an indicator needle 105. According to one embodiment, needle indicator 105 forms a snap fit connection with dial shaft 217. One or more threads 217a are formed on the surface of dial shaft 217. Probe 109 is provided at the distal end of thermometer 100. As in the previous embodiment, probe 109 defines an interior cavity 110. A nut 211 is provided at the proximal end of probe 109 within cavity 110. Dial shaft 217 extends through nut 211. Threads 217a engage with the nut so that, when probe 109 moves axially with respect to dial shaft 217, dial shaft 217 is driven to rotate about its longitudinal axis. According to one embodiment, threads 217a form a square cross sectional shape that defines four helices along the surface of shaft 217. Nut 217 defines a square opening sized to fit the square cross section of threads 217a. According to one embodiment, bearing 206 is fitted to the distal end of dial shaft 217. Biasing means 115, such as a coil spring 115 is provided in interior cavity 110 of probe 109. Spring 115 is positioned between the internal distal surface of probe cavity 110 and the distal surface of bearing 206. Spring 115 biases probe 109 in the distal direction.

FIG. 7C shows the engagement of probe 109 and outer housing 103 with the dial and dial shaft removed for clarity. Probe 109 includes keys 108 (also shown in FIG. 7A) that extend outward from the surface of the probe. Housing 103 includes corresponding keyways 107 that extend longitudinally along the inside surface of the housing. Keyways 107 allow keys 108, and hence, probe 109, to move axially with respect to housing 103 but prevent probe 109 from rotating with respect to the housing. Also, keyways 107 terminate proximal of the distal end of housing 103. Contact between keys 108 and the distal ends of keyways 107 limit the motion of probe 109 in the distal direction and prevent probe 109 from detaching from housing 103.

Force applied in the proximal direction to probe 109 pushed the probe into housing 103. Nut 211 moves along axis of dial shaft 217. Engagement of threads 217a with nut 211 causes dial shaft 217 to rotate, driving needle indicator 105 to rotate with respect to dial face 121.

Figure 8:
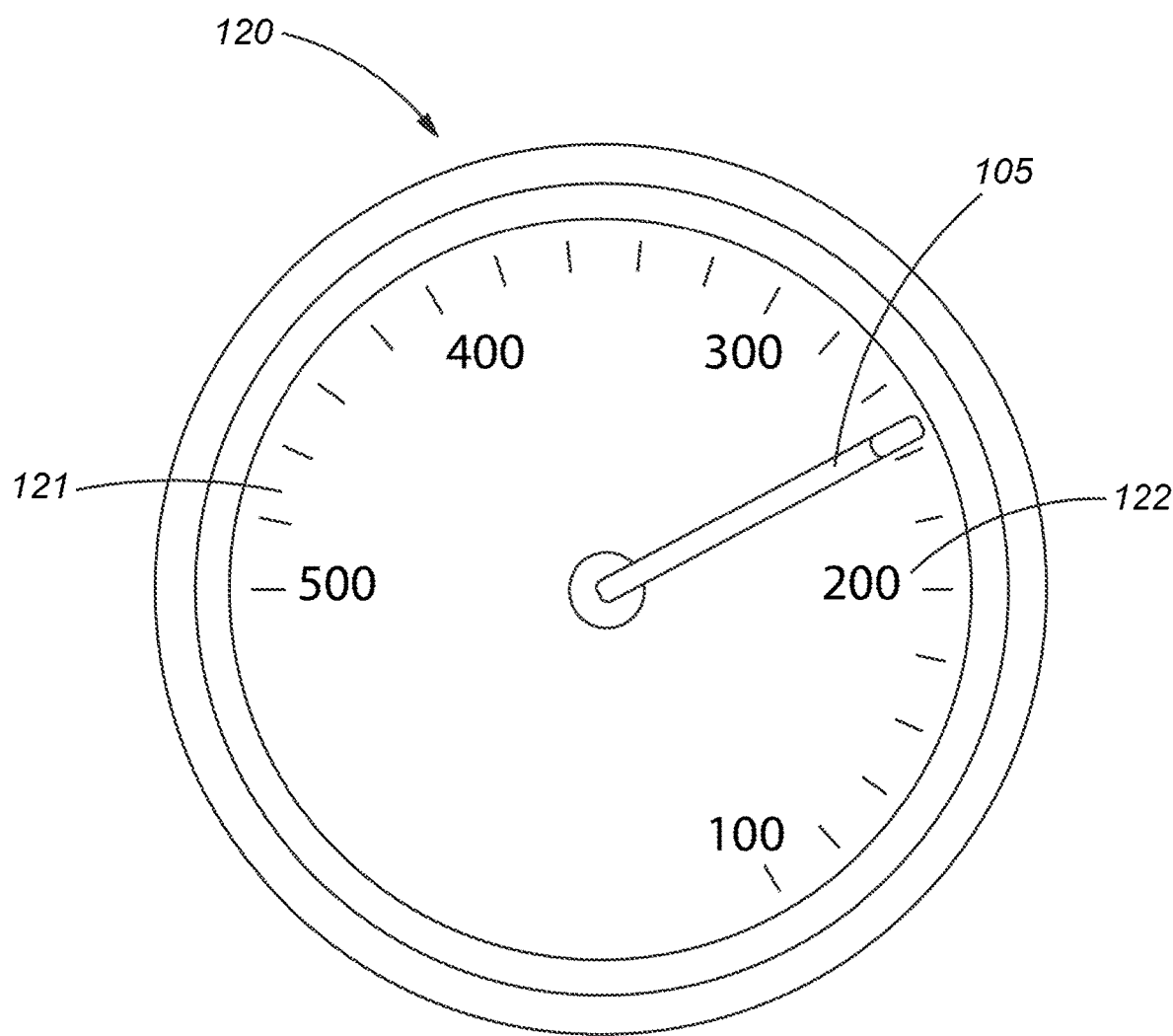
FIG. 8 is a top view of the thermometer of FIGS. 5 and 7A.

FIG. 8 shows a front view of dial case 120 for both the embodiments shown in FIGS. 6A-6C and FIGS. 7A-7B. According to one embodiment, indicia 122, such as temperature markings, are provided on dial face 121. Needle 105 moves across dial face 121 as probe 109 is pressed into housing 119 to show a simulated change in temperature as needle 105 is moved across dial face 121. Instead of, or in addition to temperature markings, other indicia, for example, terms associated with cooking food such as "rare," "medium," and "well-done" may be provided on dial face 121.

Figure 9:
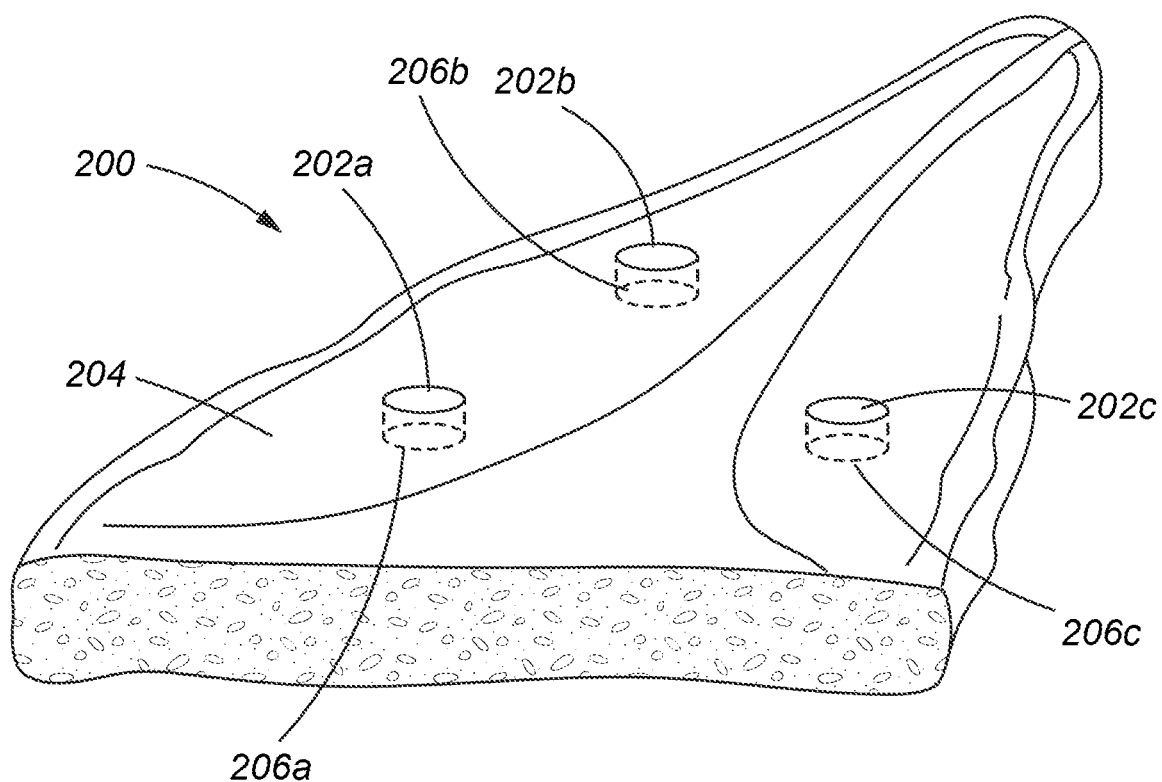
FIG. 9 is a perspective view of a simulated food item according to a further embodiment of the disclosure.
Figure 10:
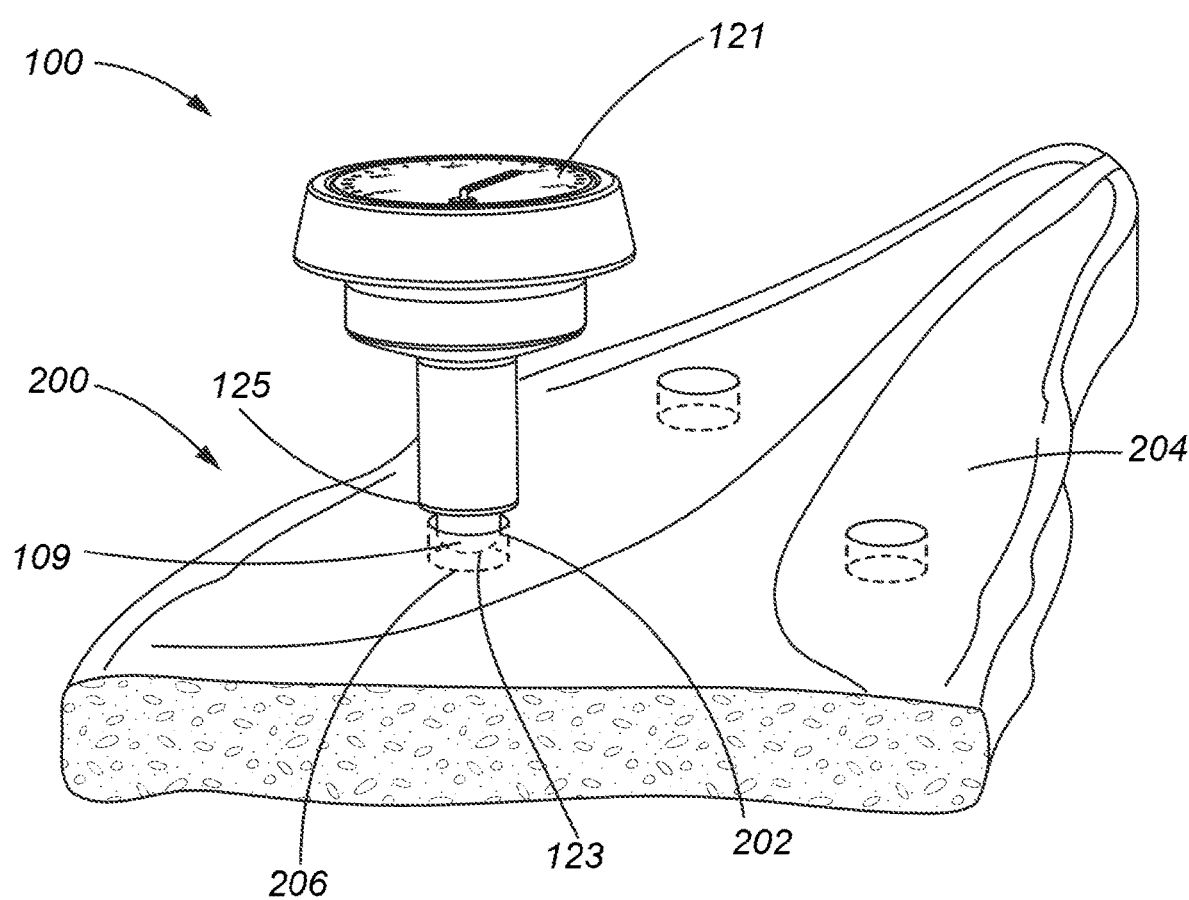
FIG. 10 is a perspective view of the thermometer of FIG. 5 or FIG. 7A being used with the simulated food item of FIG. 9.

FIGS. 9 and 10 show a further embodiment of the disclosure. As shown in FIG. 9, a simulated food item 200 may be provided along with grill 1 and thermometer 100. FIG. 9 shows a simulation of a beef steak or pork chop formed from a non-edible, non-perishable material such as wood or plastic. One or more blind holes 202a, 202b, 202c extend through the surface 204 of food item 200. Each hole has a hole bottom 206a, 206b, 206c at a selected depth below surface 204.

FIG. 10 shows thermometer 100 used in connection with food item 200. Probe 109 is inserted into a selected one of holes 202a. Probe tip 123 contacts the bottom 206a of the hole. Shoulder 125 of thermometer 100 contacts surface 204. This configuration allows probe 109 to extend from housing 119 a distance equal to the depth of the hole. The depth of the hole is selected so that dial shaft 117, and hence indicator needle 105, rotate through a selected angular distance so that needle 105 points to a selected temperature shown on dial face 121. According to one embodiment, the depths of holes 202a, 202b, 202c are selected to show different temperatures on the thermometer 100, providing the user with the experience of testing whether the food item 200 has been heated to a desired temperature, for example, to a temperature that would render the food item safe to eat.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims. Therefore, the description should not be construed as limiting the scope of the invention.

What is claimed is:

1. A simulated thermometer comprising:
   a thermometer housing having a dial face at a proximal end thereof, wherein the thermometer housing extends in a distal direction, wherein the thermometer housing encloses a housing cavity arranged along a longitudinal axis;
   a dial shaft disposed concentrically within the housing cavity along the longitudinal axis and rotatably connected with the thermometer housing;
   a probe defining a probe cavity, wherein the probe extends in the distal direction along the longitudinal axis, wherein a distal portion of the dial shaft is positioned concentrically within the probe cavity and wherein a proximal portion of the probe is positioned concentrically within a distal portion of the housing cavity, and wherein the probe is slidable along the longitudinal axis in a proximal direction and a distal direction respectively into and out from the thermometer housing and is rotationally fixed with respect to the thermometer housing; and a helical engagement mechanism on one or both of the dial shaft and probe, wherein a motion of the probe in the proximal and the distal direction causes the helical engagement to rotate the dial shaft about the longitudinal axis.

2. The thermometer of claim 1, wherein the helical engagement mechanism comprises a helical thread on an outer surface of the dial shaft and a nut fixed with the probe cavity and engaged with the thread and wherein motion of the probe in the proximal and distal directions causes the engagement of the thread and the nut to drive the dial shaft to rotate about the longitudinal axis.

3. The thermometer of claim 1, wherein the helical engagement mechanism comprises a helical groove on an inner surface of the probe and a cam follower extension connected with the dial shaft, wherein the cam follower extension travels along the helical groove when the probe is moved is the proximal and distal directions and drives the dial shaft to rotate about the longitudinal axis.

4. The thermometer of claim 1, wherein the thermometer housing further comprises a biasing mechanism arranged to apply a resilient force to bias the probe in the distal direction.

5. The thermometer of claim 4, wherein the biasing mechanism comprises a coil spring.

6. The thermometer of claim 5, further comprising a bearing rotatably fitted to a distal end of the dial shaft, wherein the coil spring is positioned between a distal surface of the bearing and a distal internal surface of the probe.

7. The thermometer of claim 1, further comprising an indicator connected the dial shaft and a dial case at a proximal end of the thermometer housing, wherein the dial face and the indicator are disposed in the dial case, wherein rotation of the dial shaft in the first or second direction causes the indicator to rotate within the dial case.

8. The thermometer of claim 7, wherein the dial face comprises a plurality of simulated temperature indicia.

9. The thermometer of claim 8, further comprising a viewing window connected with the dial case, wherein the indicator and the indicia are visible within the dial case through the viewing window.

10. The thermometer of claim 1, wherein the thermometer housing further comprises a shoulder at a distal end of the thermometer housing, wherein the probe further comprises a probe tip at a distal end of the probe, wherein the probe tip extends from the thermometer housing distal of the shoulder, and wherein movement of the probe proximally and distally relative to the thermometer housing comprises movement of the probe tip relative to the shoulder along the longitudinal axis.

11. The thermometer of claim 10, further comprising a simulated food item, wherein the simulated food item comprises:
an outer surface; and
one or more blind holes extending through the outer surface and into the food item and sized to accept insertion of the probe tip.

12. The thermometer of claim 11, wherein, a depth of the blind hole is selected so that, when the probe tip is inserted into the blind hole and contacts a bottom surface of the hole and the shoulder of the thermometer housing contacts the outer surface, the probe is displaced in the proximal direction a selected distance along the longitudinal axis to cause the dial shaft to rotate the indicator to point to a selected one of the plurality of temperature indicia.

13. The thermometer of claim 12, wherein the one or more holes comprise a plurality of blind holes, wherein each of the plurality of blind holes has a different depth and wherein, when the probe tip is inserted into a selected one of the blind holes, a different selected temperature indicia is pointed to by the indicator.

\* \* \* \* \*